United States Patent
Zhou

(10) Patent No.: US 10,223,574 B2
(45) Date of Patent: Mar. 5, 2019

(54) METHOD FOR FINGERPRINT TEMPLATE UPDATE AND TERMINAL DEVICE

(71) Applicant: GUANGDONG OPPO MOBILE TELECOMMUNICATIONS CORP., LTD., Dongguan (CN)

(72) Inventor: Yibao Zhou, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/603,805

(22) Filed: May 24, 2017

(65) Prior Publication Data
US 2017/0344804 A1 Nov. 30, 2017

(30) Foreign Application Priority Data
May 30, 2016 (CN) .......................... 2016 1 0375553

(51) Int. Cl.
G06K 9/00 (2006.01)
G06K 9/03 (2006.01)

(52) U.S. Cl.
CPC ..... G06K 9/00093 (2013.01); G06K 9/00006 (2013.01); G06K 9/00013 (2013.01); G06K 9/00073 (2013.01); G06K 9/00926 (2013.01); G06K 9/036 (2013.01)

(58) Field of Classification Search
CPC ........... G06K 9/00093; G06K 9/00006; G06K 9/00013; G06K 9/00073; G06K 9/00926; G06K 9/036; G06F 21/32; G06F 2203/0338
See application file for complete search history.

(56) References Cited

U.S. PATENT DOCUMENTS

| 9,195,879 B1 * | 11/2015 | Du ...................... G06K 9/00067 |
| 2013/0038426 A1 * | 2/2013 | Yamada ............. G06K 9/00926 340/5.82 |
| 2016/0147825 A1 | 5/2016 | Chiang et al. |
| 2016/0147987 A1 * | 5/2016 | Jang ........................ G06F 21/32 726/19 |
| 2017/0083415 A1 * | 3/2017 | Reza ....................... G06F 17/30 |
| 2017/0200043 A1 * | 7/2017 | Wu ..................... G06K 9/00087 |

FOREIGN PATENT DOCUMENTS

| CN | 101231691 A | 7/2008 |
| CN | 101499130 A | 8/2009 |
| CN | 105303176 A | 2/2016 |

(Continued)

OTHER PUBLICATIONS

Office Action 1 issued in corresponding EP application No. 17170324.2 dated Jul. 25, 2018.

*Primary Examiner* — Ali Bayat
(74) *Attorney, Agent, or Firm* — Young Basile Hanlon & MacFarlane, P.C.

(57) ABSTRACT

A method for fingerprint template update may include the follows. A target fingerprint image that is successfully matched is obtained, and the target fingerprint image is assessed. When the result of assessing the target fingerprint image meets a fingerprint template update condition, a fingerprint template that matches with the target fingerprint image is updated according to the target fingerprint image. A related terminal device is also provided.

17 Claims, 5 Drawing Sheets

(56) References Cited

FOREIGN PATENT DOCUMENTS

| | | |
|---|---|---|
| CN | 105389565 A | 3/2016 |
| CN | 105389566 A | 3/2016 |
| CN | 105447454 A | 3/2016 |
| EP | 2416274 A1 | 2/2012 |
| JP | 2007011764 A | 1/2007 |
| WO | 2016032650 A1 | 3/2016 |

* cited by examiner

METHOD FOR FINGERPRINT TEMPLATE UPDATE AND TERMINAL DEVICE

CROSS REFERENCE TO RELATED APPLICATION

This application claims priority to Chinese Patent Application No. 201610375553.4, filed on May 30, 2016, the content of which is hereby incorporated by reference in its entirety.

TECHNICAL FIELD

The present disclosure relates to the field of electronic technology, and in particular, to a method for fingerprint template update and a terminal device.

BACKGROUND

Fingerprint identification technology is a standard configuration of a flagship model for vendors of mainstream terminal devices (such as smart phones, tablet computers, etc.). Fingerprint identification is not only used to unlock and wake up a terminal device, but is also an important link in mobile payment. Fingerprint payment imposes higher security requirements while facilitating use for users.

To meet appearance requirements, a fingerprint module in a terminal device in the current market is fabricated to be smaller, which causes a fingerprint area for recognition to be excessively small. If an area of an entered fingerprint template is excessively small, a fingerprint identification rate in a subsequent using stage is relatively low because fingerprint information of an entire finger is not entered completely. That is, a false rejection rate is relatively high. If the user is required to enter the fingerprint template for too many times during fingerprint registration, user experience is affected. Moreover, even if the fingerprint template is entered for many times, it is still hard to enter the fingerprint information of the entire finger completely. Therefore, how to keep improving the fingerprint template is needed to be resolved.

BRIEF DESCRIPTION OF THE DRAWINGS

In order to illustrate the technical solutions of the embodiments of the present disclosure more clearly, the drawings used in the description of the embodiments will be briefly described, it will be apparent that the drawings described in the following are embodiments of the present disclosure, and it will be apparent to those skilled in the art that other drawings can be obtained from the drawings without any creative effort.

DETAILED DESCRIPTION

Figure 1:
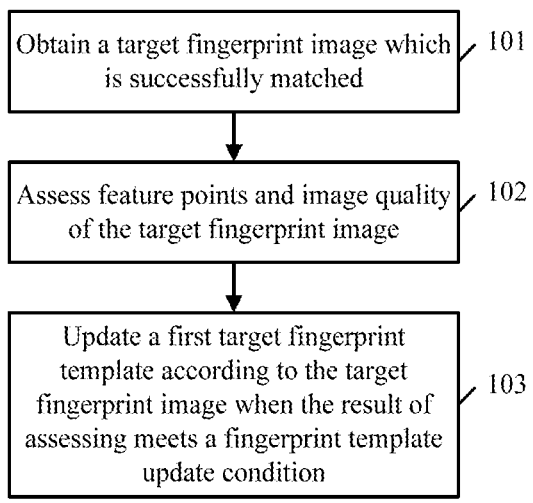
FIG. 1 is a flowchart of a method for fingerprint template update according to an embodiment of the present disclosure.

In order to provide a better understanding of the present disclosure for those skilled in the art, technical schemes of the embodiments of the present disclosure will be described in the following description in conjunction with the accompanying drawings clearly and completely. Obviously, the described embodiments are merely a part rather than all of embodiments of the present disclosure. All other embodiments obtained by those of ordinary skill in the art based on the embodiments of the present disclosure without creative efforts shall fall within the scope of the present disclosure.

The following will be described in detail.

The terms "first", "second", "third", and "fourth" used in the specification, the claims, and the accompany drawings of the present disclosure are used for distinguishing different objects rather than describing a particular order. The terms "include", "comprise", and "have" as well as variations thereof are intended to cover non-exclusive inclusion. For example, a process, method, system, product, or apparatus including a series of processes or units is not limited to the listed blocks or units, it can optionally include other processes or units that are not listed. Alternatively, other processes or units inherent to the process, method, product, or device can be included either.

The term "embodiment" referred to herein means that a particular feature, structure, or characteristic described in connection with the embodiment may be contained in at least one embodiment of the present disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

In the following, some of the terms used herein are explained to facilitate the understanding of those skilled in the art.

1) The term "terminal device", also known as user equipment (UE), means a device that provides voice and/or data connectivity to users, examples of which includes hand-held devices with wireless connectivity function, on-board devices and the like. Common terminals include, for example, mobile phones, tablets, laptops, handheld computers, mobile internet devices (MID), and wearable equipment such as smart watches, smart bracelets, and pedometers and so on. Terminal devices in the present disclosure can also include automated teller machines (ATM), ticket machines, entrance guard machines, medical equipment, and other terminals equipped with fingerprint recognition function.

2) A fingerprint recognition sensor can realize the identification of individual fingerprint features through a specific induction unit. At present, the fingerprint recognition sensor is mainly divided into an optical fingerprint unit, a capacitive fingerprint unit, and a radio frequency (RF) fingerprint unit. The fingerprint recognition sensor can be set in combination with a metal dome array (in other words, dome key) of a terminal, and can be set on the front surface, the rear surface, or the side surface of the terminal, the present disclosure is not limited thereto. Similarly, the fingerprint recognition sensor can be set in combination with the touch screen of the terminal. For example, the fingerprint recognition sensor can be set below the touch panel of the touch screen.

3) The term "characteristic" refers to fingerprint features of a fingerprint image. The fingerprint characteristic data includes general features and local features, and the general features include basic print patterns such as loop, arch, and whorl, while the local features refer to minutiae points on the fingerprint. Two fingerprints often have the same general features, however, their local features, that is, minutiae points, cannot be exactly the same. Prints of a fingerprint are not continuous, smooth, or straight, but often break, bifurcated, or curved. These break points, bifurcation points, and turning points are called "minutiae points", which can provide confirmation information of the uniqueness of a fingerprint. Minutiae points on a fingerprint have the following four different properties: 1) Ending, means an end of a print; 2) Bifurcation, means the splitting of a print into two or more than two prints; 3) Ridge Divergence, means the separating of two parallel prints; 4) Dot or Island, means a particularly short print that become a little dot; 5) Enclosure, means a small ring formed when a print separated into two prints and these two prints immediately merged into one. Fingerprint characteristic data still includes the follows: 1) Short Ridge, means a print which is short but not so short to be a little dot; 2) Orientation, means that a minutiae point can toward a certain direction; 3) Curvature, describes the speed at which the orientation of a print changes; 4) Position, which is described via (x, y) coordinates, can be absolute, or can be inductively recognized relative to triangular points or feature points.)

The terms "a number of" or "multiple" means two or more than two. The term "and/or" is used to describe the association of associated objects and indicates that there can be three relationships. For example, "A and/or B" means three situations, that is, A alone, both A and B, or B alone. The character "/" generally indicates that the associated objects before and after the character are in an "OR" relationship.

Figure 9:
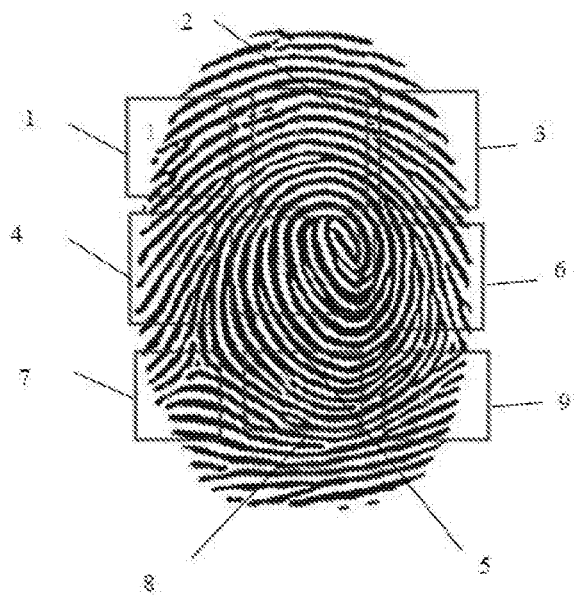
FIG. 9 is a schematic diagram illustrating an example of a fingerprint template.

In the present disclosure, the term "fingerprint template" means that, when a fingerprint function of a terminal such as a mobile phone is enabled for the first time, the user may be asked to undergo a fingerprint registration process. During the fingerprint registration, the user puts his or her finger on a fingerprint sensor for fingerprint image reception, and fingerprint feature information of the received fingerprint images will be extracted to form a fingerprint template, usually, one finger corresponds to one fingerprint template. Generally, the fingerprint sensor may receive 10-20 times for each finger in order to receive the whole fingerprint face and generate a comprehensive fingerprint template. FIG. 9 illustrates an exemplary fingerprint template, and each number marked in the fingerprint of FIG. 9 refers to fingerprint feature information.

In the following, when we refer to "receive" or "receiving" fingerprint image or fingerprint data, it means that a terminal device or a fingerprint recognition sensor of the terminal device or other related components of the terminal device can acquire, collect, obtain or in other manners to get the fingerprint image or fingerprint data. The present disclosure is not limited thereto.

The present disclosure relates to a method for fingerprint template update. The method includes the follows. A target fingerprint image which is successfully matched is obtained, and the target fingerprint image is assessed. When the result of assessing the target fingerprint image meets a fingerprint template update condition, a fingerprint template that matches the target fingerprint image is updated according to the target fingerprint image, so that the fingerprint template is continuously improved.

The present disclosure further relates to a terminal device to execute the fingerprint template update method.

FIG. 1 is a flowchart of a method for fingerprint template update according to an embodiment of the present disclosure. The method may begin at block 101.

At block 101, a terminal device obtains a target fingerprint image which is successfully matched.

At block 102, the terminal device assesses feature points and image quality of the target fingerprint image. The terminal device may determine a result by assessing feature points and image quality of the target fingerprint image.

At block 103, when the result of assessing the feature points and the image quality meets a fingerprint template update condition, the terminal device updates a first target fingerprint template according to the target fingerprint image. The first target fingerprint template is a fingerprint template that matches with a fingerprint of the target fingerprint image.

Currently, a fingerprint template is generally not changed any more after being registered initially. When the quality of a fingerprint template registered by a user is high, a fingerprint identification rate is subsequently high, and the user experience is relatively good. When the quality of the fingerprint template registered by the user is low, the fingerprint identification rate is subsequently low, and the user experience is relatively poor. However, the user has not received fingerprint registration training, and it is hard to ensure the quality of the registered fingerprint template. According to the present disclosure, the fingerprint template is open, and can keep being improved and complemented in a subsequent using process. In this way, fingerprint identification performance is higher when the user uses the terminal device for a long time. According to the present disclosure, the method for updating a fingerprint template includes the follows. A target fingerprint image that succeeds in fingerprint matching is obtained, and a fingerprint template update assessment is performed on the target fingerprint image. When the target fingerprint image meets a fingerprint template update condition, a fingerprint template that matches with the target fingerprint image is updated according to the target fingerprint image, so that the fingerprint template is continuously improved.

Optionally, the method illustrated in FIG. 1 further includes the follows before executing the process at block 103. The terminal device determines whether the number of fingerprint templates pre-stored in the terminal device is greater than or equal to a first threshold.

Figure 2:
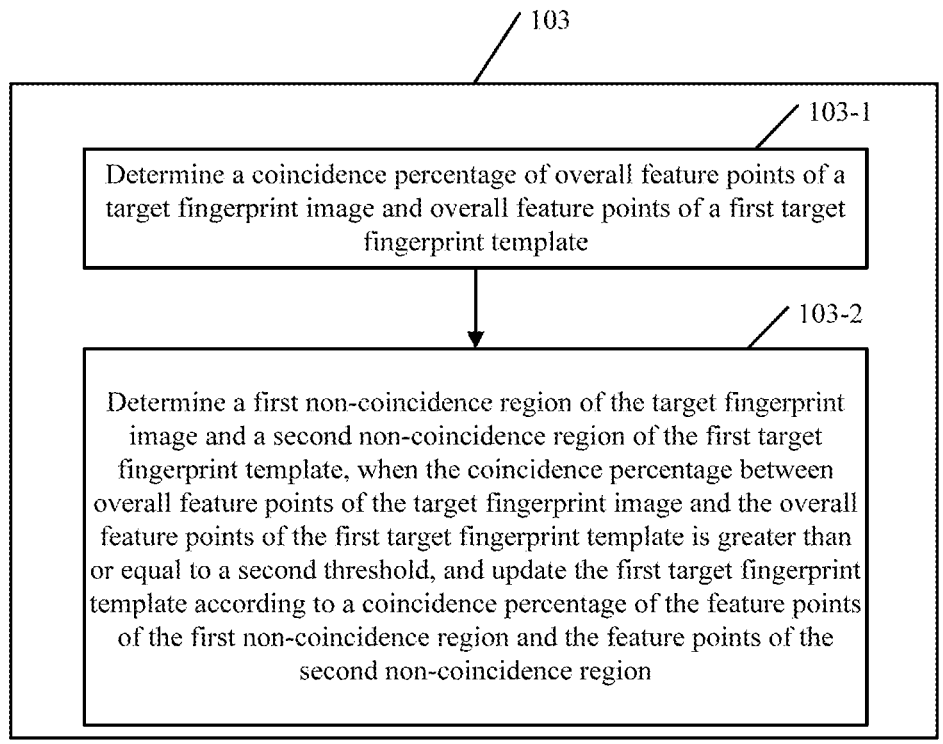
FIG. 2 is a sub flowchart of a process at block 103 of FIG. 1 according to an embodiment of the present disclosure.

When the number of the fingerprint templates pre-stored in the terminal device is greater than or equal to the first threshold, as illustrated in FIG. 2, the manner in which the process at block 103 is implemented may include the follows.

At block 103-1, the terminal device determines a coincidence percentage of feature points of the target fingerprint image and feature points of the first target fingerprint template.

At block 103-2, when the coincidence percentage of the overall feature points of the target fingerprint image and the overall feature points of the first target fingerprint template is greater than or equal to a second threshold, the terminal device determines a first non-coincidence region of the target fingerprint image and a second non-coincidence region of the first target fingerprint template, and updates the first target fingerprint template according to a coincidence percentage of feature points of the first non-coincidence region and feature points of the second non-coincidence region. The coincident percentage of the feature points of the first non-coincidence region and the feature points of the second non-coincidence region is less than the second threshold.

In at least one alternative embodiment, when the number of fingerprint templates pre-stored in the terminal device is less than the first threshold, the terminal device stores the target fingerprint image for generating a new fingerprint template.

For example, the number of the fingerprint templates that can be stored in the terminal device is generally controlled within a specific threshold (that is, the first threshold, which may be, for example, 10, 15, 18, 20, 30, or other). The terminal device firstly determines whether the number of the fingerprint templates pre-stored in the terminal device exceeds a threshold before executing the process at block 103. When the number does not exceed the threshold, the terminal device directly stores the target fingerprint image for generating a new fingerprint template. When the number exceeds the threshold, the terminal device determines the coincidence percentage of the overall feature points of the target fingerprint image and the overall features points of the first target fingerprint template, and when the coincidence percentage of the overall feature points of the target fingerprint image and the overall features points of the first target fingerprint template exceeds the second threshold (80%, 85%, or other), the terminal device determines the first non-coincidence region of the target fingerprint image and the second non-coincidence region of the first target fingerprint template, and updates the first target fingerprint template according to the coincidence percentage of the feature points of the first non-coincidence region and the feature points of the second non-coincidence region. The coincident percentage of the feature points of the first non-coincidence region and the feature points of the second non-coincidence region is less than the second threshold. When the coincidence percentage of the overall feature points of the target fingerprint image and the overall features points of the first target fingerprint template does not exceed the second threshold, the terminal device does not perform fingerprint update this time.

In at least one alternative embodiment, when the coincidence percentage of the feature points of the first non-coincidence region and the feature points of the second non-coincidence region is less than or equal to a sixth threshold, the terminal device adds the feature points of the first non-coincidence region into the first target fingerprint template. When the coincidence percentage of the feature points of the first non-coincidence region and the feature points of the second non-coincidence region is greater than the sixth threshold and less than or equal to a seventh threshold, the terminal device adds feature points of the first non-coincidence region which are not included in the second non-coincidence region into the second non-coincidence region. When the coincidence percentage of the feature points of the first non-coincidence region and the feature points of the second non-coincidence region is greater than the seventh threshold and less than or equal to an eighth threshold, the terminal device replaces feature points of the second non-coincidence region with feature points of the first non-coincidence region. The eighth threshold may be less than the second threshold.

For example, it is assumed that the first non-coincidence region is A and the second non-coincidence region is B, when the coincidence percentage of the feature points of the A and B is less than or equal to the sixth threshold (for example, approximately 5%), it indicates that the first target fingerprint template does not include the A. Under this condition, the feature points of the A are directly added into the first target fingerprint template. When the coincidence percentage of the feature points of the A and B is greater than the sixth threshold and less than or equal to the seventh threshold (for example, from 20% to 40%), it indicates that the first target fingerprint template includes a small feature points of the A. Under this condition, feature points of the A which are not included in the B are directly added into the B. When the coincidence percentage of the feature points of the A and the B is greater than the seventh threshold and less than or equal to the eighth threshold (for example, from 40% to 60%), it indicates that the first target fingerprint template includes most feature points of the region A. Under this condition, the feature points of the B are replaced with the feature points of the A directly.

It shall be noted that a coincidence region indicates that coincidence percentage of the feature points of the first target fingerprint image and feature points of a certain region of the first target fingerprint template is quite high (for example, greater than 80%). Similarly, a non-coincidence region indicates that a coincidence percentage of the feature points of the first target fingerprint image and feature points of a certain region of the first target fingerprint template is relatively low (for example, less than 30%).

In at least one alternative embodiment, the manner in which the process at block 102 is implemented may include the follows.

The terminal device determines whether similarity between overall features of the target fingerprint image and overall features of the first target fingerprint template is greater than or equal to a third threshold, and determines whether the clarity of the target fingerprint image is greater than or equal to a fourth threshold.

The process of determining that the result of assessing the feature points and the image quality meets a fingerprint template update condition may include the follows.

When the similarity between the overall features of the target fingerprint image and the overall features of the first target fingerprint template is greater than or equal to the third threshold and the clarity of the target fingerprint image is greater than or equal to the fourth threshold, it is determined that the result of assessing the feature points and the image quality meets the fingerprint template update condition; otherwise, it is determined that the result of assessing the feature points and the image quality does not meet the fingerprint template update condition.

For example, a fingerprint match threshold may vary with an application scenario. For example, in a scenario of fingerprint payment, the fingerprint match threshold needs to be relatively high, and in a scenario of fingerprint unlock, the fingerprint match threshold is lower than that in the scenario of fingerprint payment. Therefore, in order to better update a fingerprint template, the target fingerprint image may be assessed before executing the process at block 103. The implementation manner includes the follows. First, the terminal device determines whether the similarity between the overall features of the target fingerprint image and the overall features of the first target fingerprint template is greater than or equal to the third threshold (for example, greater than 95%), and determines whether the clarity of the target fingerprint image is greater than or equal to the fourth threshold (for example, greater than 60%). When both of the two conditions are met, it is determined that the target fingerprint image meets the fingerprint template update condition, and the process at block 103 can be performed directly.

Figure 3:
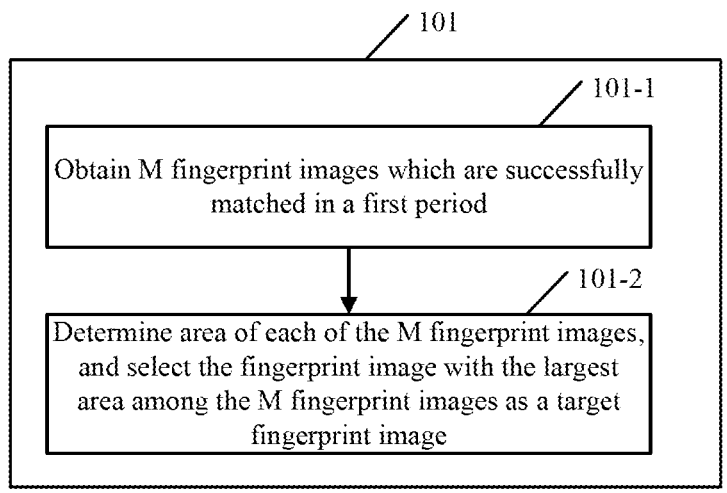
FIG. 3 is a sub flowchart of a process at block 101 of FIG. 1 according to another embodiment of the present disclosure.

In at least one alternative embodiment, as illustrated in FIG. 3, the manner in which the process at block 101 is implemented may include the follows.

At block 101-1, the terminal device obtains M fingerprint images which are successfully matched in a first period, where M is an integer greater than 1.

At block 101-2, the terminal device determines area of each of the M fingerprint images, and selects the fingerprint image with the largest area among the M fingerprint images as the target fingerprint image.

For example, when the user presses a finger in a different manner, the area of a fingerprint image obtained by a fingerprint recognition sensor may differ. Using a fingerprint image with a larger area to update the fingerprint template achieves a better effect than using a fingerprint image with a smaller area to update the fingerprint template. Therefore, the terminal device obtains the M fingerprint images that succeed in fingerprint matching in the first period (one day, three days, one week, two weeks, or other), and then selects the fingerprint image with the largest area from the M fingerprint images as the target fingerprint image. In addition, comparing with performing fingerprint template update assessment each time matching succeeds, by performing fingerprint template update assessment on multiple fingerprint images that succeed in fingerprint matching in a period, this solution reduces power consumption of the terminal device.

Figure 4:
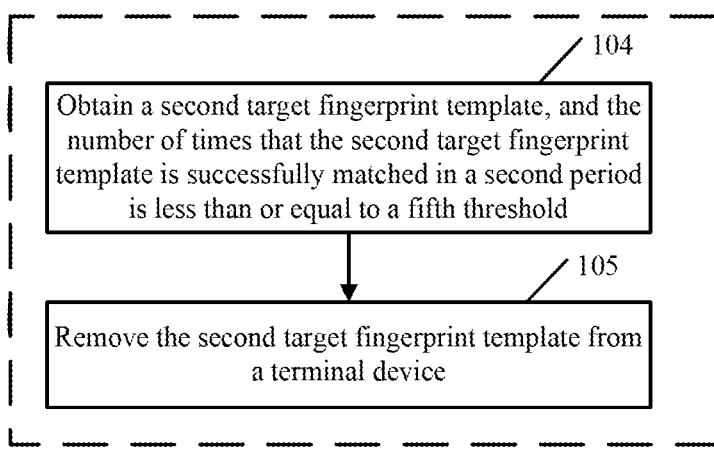
FIG. 4 is an additional sub flowchart based on the method for fingerprint template update illustrated in FIG. 1.

In at least one alternative embodiment, as illustrated in FIG. 4, the method illustrated by FIG. 1 may further include the follows At block 104, the terminal device obtains a second target fingerprint template, and the number of times that the second target fingerprint template is successfully matched in a second period is less than or equal to a fifth threshold.

At block 105, the terminal device removes the second target fingerprint template from the terminal device.

For example, multiple fingerprint templates are generally stored in the terminal device. Fingerprint templates that are infrequently matched are generally some fragments or fingerprint templates of low fingerprint image quality. Therefore, to improve the fingerprint templates stored in the terminal device, the terminal device may remove the infrequently matched fingerprint templates. An implementation manner thereof may include the follows. The terminal device obtains the second target fingerprint template the number of times that the second target fingerprint template is matched in the second period is less than or equal to the fifth threshold (five times, six times, eight times, ten times, or other). The terminal device then removes the second target fingerprint template directly. It is assumed that the second period is one week, the fifth threshold is 5, all pre-stored fingerprint templates are finger template 1, finger template 2, finger template 3, finger template 4, and finger template 5, and the number of times that the finger template 1 is successfully matched in one week is 50 times, the number of times that the finger template 2 is successfully matched in one week is 30 times, the number of times that the finger template 3 is successfully matched in one week is 20 times, the number of times that the finger template 4 is successfully matched in one week is 2 times, and the number of times that the finger template 5 is successfully matched in one week is 3 times. Therefore, the fingerprint template 4 and the fingerprint template 5 are infrequently matched, and the fingerprint template 4 and the fingerprint template 5 are removed directly.

Figure 5:
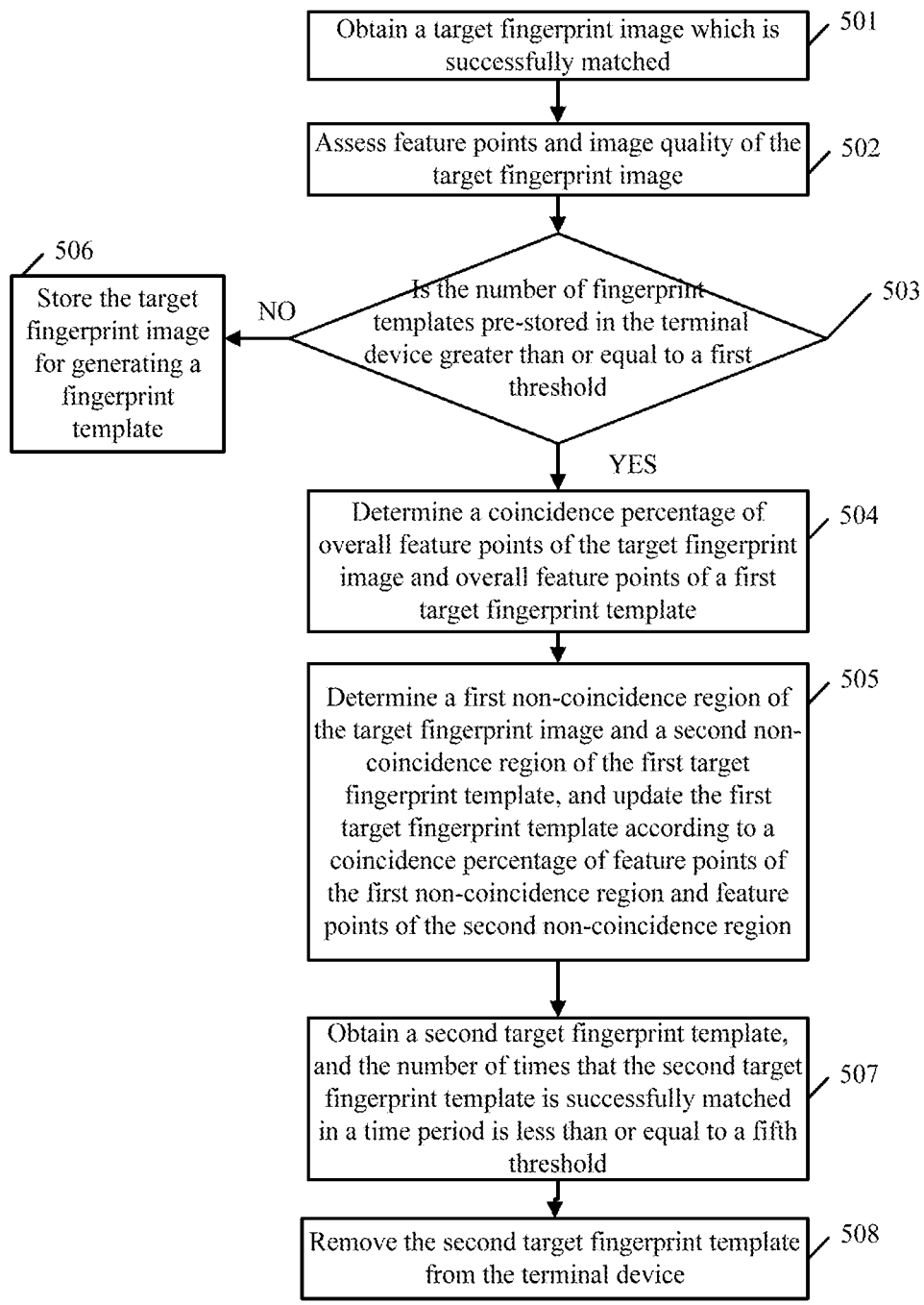
FIG. 5 is a flowchart of a method for fingerprint template update according to another embodiment of the present disclosure.

As illustrated in FIG. 5, an embodiment of the present disclosure further provides another more detailed method procedure which may include the follows.

At block 501, a terminal device obtains a target fingerprint image which is successfully matched.

At block 502, the terminal device assesses feature points and image quality of the target fingerprint image.

When the result of assessing the feature points and the image quality meets a fingerprint template update condition, proceed to block 503.

When the result of assessing the feature points and the image quality does not meet the fingerprint template update condition, no operation is performed.

At block 503, the terminal device determines whether the number of fingerprint templates pre-stored in the terminal device is greater than or equal to a first threshold.

When the number is greater than or equal to the first threshold, proceed to block 504.

When the number is not greater than or not equal to the first threshold, proceed to block 506.

At block 504, the terminal device determines a coincidence percentage of feature points of the target fingerprint image and feature points of a first target fingerprint template.

When the coincidence percentage of the feature points of the target fingerprint image and the feature points of the first target fingerprint template is greater than or equal to a second threshold, proceed to block 505.

When the coincidence percentage of the feature points of the target fingerprint image and the feature points of the first target fingerprint template is less than the second threshold, no operation is performed, that is, update of the template information is not performed.

At block 505, the terminal device determines a first non-coincidence region of the target fingerprint image and a second non-coincidence region of the first target fingerprint template, and updates the first target fingerprint template according to a coincidence percentage of the feature points of the first non-coincidence region and the feature points of the second non-coincidence region. The coincident percentage of the feature points of the first non-coincidence region and the feature points of the second non-coincidence region is less than the second threshold.

At block 506, the terminal device stores the target fingerprint image for generating a fingerprint template.

At block 507, the terminal device obtains a second target fingerprint template, and the number of times that the second target fingerprint template is successfully matched in the second period is less than or equal to a fifth threshold.

At block 508, the terminal device removes the second target fingerprint template from the terminal device.

It shall be noted that the processes at block 507 and block 508 illustrated in FIG. 5 may be performed before the process at block 501 or during executing of the processes from the process at block 501 to the process at block 506, and the present disclosure is not limited thereto. In addition, for the implementation processes of the method illustrated in FIG. 5, reference may be made to the implementation processes of the foregoing method, and details are not described herein.

Figure 6:
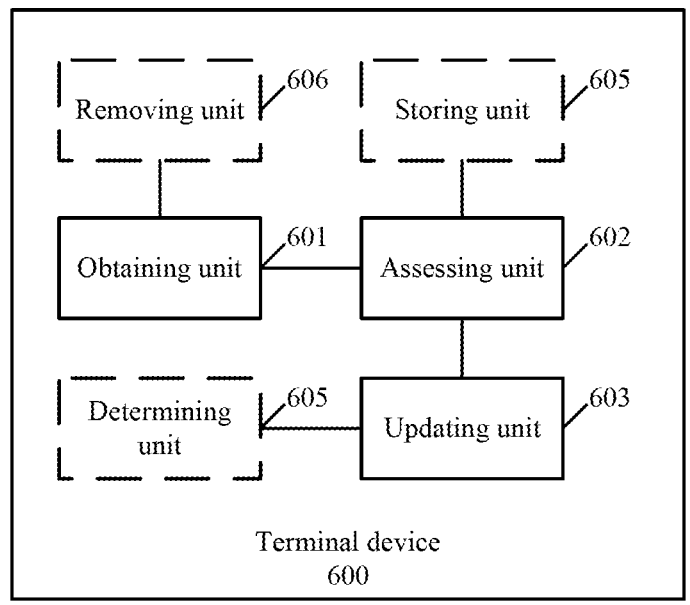
FIG. 6 is a structure diagram of a terminal device according to an embodiment of the present disclosure.

An embodiment of the present disclosure further provides a terminal device 600. As illustrated in FIG. 6, the terminal device 600 includes an obtaining unit 601, an assessing unit 602, and an updating unit 603.

The obtaining unit 601 is configured to obtain a target fingerprint image which is successfully matched.

The assessing unit 602 is configured to assess feature points and image quality of the target fingerprint image.

The updating unit 603 is configured to update a first target fingerprint template according to the target fingerprint image when the result meets a fingerprint template update condition, and the first target fingerprint template is a fingerprint template that matches with the target fingerprint image.

In at least one alternative embodiment, the terminal device further includes a determining unit 604 configured to determine whether the number of fingerprint templates pre-stored in the terminal device is greater than or equal to a first threshold.

When the number of the fingerprint templates pre-stored in the terminal device is greater than or equal to the first threshold, the updating unit 603 is configured to determine a coincidence percentage of feature points of the target fingerprint image and feature points of the first target fingerprint template. When the coincidence percentage of the feature points of the target fingerprint image and the feature points of the first target fingerprint template is greater than or equal to a second threshold, the updating unit 603 is configured to determine a first non-coincidence region of the target fingerprint image and a second non-coincidence region of the first target fingerprint template, and update the first target fingerprint template according to a coincidence percentage of feature points of the first non-coincidence region and feature points of the second non-coincidence region. The coincident percentage of the feature points of the first non-coincidence region and the feature points of the second non-coincidence region is less than the second threshold.

In at least one alternative embodiment, the terminal device further includes a storing unit 605 configured to store the target fingerprint image for generating a fingerprint template when the number of the fingerprint templates pre-stored in the terminal device is less than the first threshold.

In an least one alternative embodiment, the assessing unit 602 is configured to determine whether similarity between overall features of the target fingerprint image and overall features of the first target fingerprint template is greater than or equal to a third threshold, and determine whether the clarity of the target fingerprint image is greater than or equal to a fourth threshold. The updating unit 603 is configured to perform the follows to determine that the result of assessing the feature points and the image quality meets a fingerprint template update condition. When the similarity between the overall features of the target fingerprint image and the overall features of the first target fingerprint template is greater than or equal to the third threshold and the clarity of the target fingerprint image is greater than or equal to the fourth threshold, the updating unit 603 determines that the result of assessing the feature points and the image quality meets the fingerprint template update condition.

In at least one alternative embodiment, the obtaining unit 601 is further configured to obtain M fingerprint images which are successfully matched in a first period, and M is an integer greater than 1. The obtaining unit 601 is further configured to determine area of each of the M fingerprint images, and select the fingerprint image with the largest area among the M fingerprint images as the target fingerprint image.

In at least one alternative embodiment, the obtaining unit 601 is further configured to obtain a second target fingerprint template, and the number of times that the second target fingerprint template is successfully matched in the second period is less than or equal to a fifth threshold The terminal device further includes a removing unit 606 configured to remove the second target fingerprint template from the terminal device.

It shall be noted that the foregoing units (the obtaining unit 601, the assessing unit 602, the updating unit 603, the determining unit 604, the storing unit 605, and the removing unit 606) are configured to perform relevant processes of the method illustrated in FIGS. 1-5.

In this embodiment, the terminal device 600 is presented in a form of units. The "units" herein may be an application-specific integrated circuit (ASIC), a processor that executes one or more software or firmware programs, a memory, an integrated logical circuit, and/or other devices that provide such functions. In addition, the obtaining unit 601, the assessing unit 602, the updating unit 603, the determining unit 604, the storing unit 605, and the removing unit 606 may be implemented by a processor 701 of a terminal device illustrated by FIG. 7.

Figure 7:
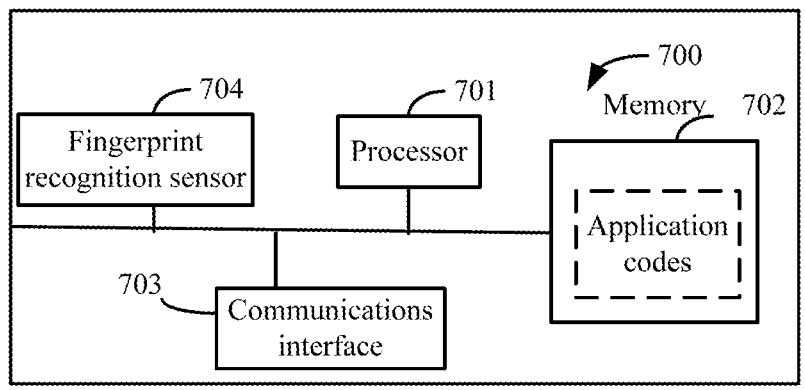
FIG. 7 is a structure diagram of another terminal device according to an embodiment of the present disclosure.

As illustrated in FIG. 7, the terminal device 700 may be implemented as a structure in FIG. 7. The terminal device 700 includes at least one processor 701, at least one memory 702, at least one communication interface 703, and a fingerprint recognition sensor 704. The processor 701, the memory 702, the fingerprint recognition sensor 704, and the communications interface 703 are coupled and communicate with each other via a communications bus.

The processor 701 may be a general-purpose central processing unit (CPU), a microprocessor, an ASIC, or one or more integrated circuits used to control execution of a program of the foregoing solution.

The communication interface 703 is configured to communicate with another device or communication network such as the Ethernet, a radio access network (RAN), or a wireless local area network (WLAN).

The memory 702 may be, but without being limited to, a read-only memory (ROM) or another type of static storage device that can store static information and instructions, a random access memory (RAM), or another type of dynamic storage device that can store information and instructions, or may be an electrically erasable programmable read-only memory (EEPROM), a compact disc read-only memory (CD-ROM), or other disc storage media, optical disc storage (including compact disc, laser disc, optical disc, digital versatile disk, and Blu-ray disc), magnetic disc storage media or other magnetic storage devices, or any other media that can be used to carry or store expected program codes in an instruction form or a data structure form and that can be accessed by a computer. The memory may be stand-alone and coupled to the processor via a bus. The memory may also be integrated with a processor.

The memory 702 is configured to store application codes for executing the foregoing solution, and the application codes are executed under control of the processor 701. The processor 701 is configured to execute the application codes stored in the memory 702.

The codes stored in the memory 702 may execute the fingerprint template update methods illustrated by FIGS. 1-5 and performed by the terminal device provided above, for example, obtain a target fingerprint image which is successfully matched, assess feature points and image quality of the target fingerprint image, and update a first target fingerprint template according to the target fingerprint image when a result of assessing the feature points and the image quality meets a fingerprint template update condition, and the first target fingerprint template is a fingerprint template that successfully matches with a fingerprint of the target fingerprint image.

An embodiment of the present disclosure further provides an application scenario. The above terminal device is a mobile phone. The following will specifically illustrate various components of the mobile phone in combination with FIG. 8. The mobile phone may include an RF circuit 810, a memory 820, an input unit 830, a display unit 840, an audio circuit 860, and a processor 880. In at least one alternative embodiment, the mobile phone may further include at least one sensor 850 and a wireless fidelity (WiFi) module 870.

The RF circuit 810 may be configured to receive and transmit signals in an information receiving and transmitting or communication process, and transmit received downlink information of a base station to the processor 880 for processing. In addition, uplink data is transmitted to the base station. Generally, the RF circuit 810 includes, but is not limited to, an antenna, at least one amplifier, a transceiver, a coupler, a low noise amplifier (LNA), a duplexer, etc. In addition, the RF circuit 810 may further communicate with other devices via wireless communication and a network. The wireless communication may use any one communication standard or protocol, including, but not limited to, a global system of mobile communication (GSM), general packet radio service (GPRS), code division multiple access (CDMA), wideband code division multiple access (WCDMA), long term evolution (LTE), an E-mail, short messaging service (SMS), etc.

The memory 820 may be configured to store software programs and modules, and the processor 880 executes various function applications and data processing of the mobile phone by running the software programs and the modules stored in the memory 820. The memory 820 may mainly include a storage program region and a storage data region. The storage program region may store an operation system, and an application program needed for at least one function (such as a function of obtaining a fingerprint image that succeeds in fingerprint matching, a function of assessing fingerprint image, a function of updating a fingerprint template, and the like). The storage data region may store data (such as history fingerprint image data that succeeds in fingerprint matching, the number of times that all fingerprint templates are successfully matched in a second period) created according to use of the mobile phone. In addition, the memory 820 may include a high-speed RAM, and may further include a non-volatile memory such as a disk storage device, a flash device, or other non-volatile solid storage devices.

The input unit 830 may be configured to receive input digital or character information and generate key signal input associated with user setting and functional control of the mobile phone. Specifically, the input unit 830 may include a touch panel 831, other input devices 832, and a fingerprint recognition sensor 833. The touch panel 831 is also called as a touch screen, capable of collecting touch operations of user executed thereon or nearby (for example, operations of a user executed on the touch panel 831 or nearby the touch panel 831 by using fingers or any suitable objects or accessories such as a touch pen), and driving a corresponding connecting apparatus according to a preset program. Alternatively, the touch panel 831 may include two parts, namely a touch detection apparatus and a touch controller. The touch detection apparatus detects the touch direction of the user, detects signals bought by the touch operation and transmits the signals to the touch controller. The touch controller receives touch information from the touch detection apparatus, converts the touch information into contact coordinates, transmits the contact coordinates to the processor 880, and can receive a command sent by the processor 880 to be executed. In addition, the touch panel 831 may be implemented by means of multiple types such as a resistance type, a capacitance type, infrared rays, and surface acoustic waves. The input unit 830 may further include, in addition to the touch panel 831, other input devices 832. Specifically, the other input devices 832 may include, but are not limited to, one or more of a physical keyboard, a functional key (such as a volume control key and a switch key), a track ball, a mouse, and an operating rod. The fingerprint recognition sensor 833 can be set in combination with a dome key of the terminal device, and can also be set in combination with the touch panel 831. For example, the fingerprint recognition sensor 833 is set below the touch panel 831. When a finger of a user presses an application icon, the fingerprint recognition sensor below the touch panel 831 can collect fingerprint data of the finger of the user.

The display unit 840 may be configured to display information input by the user or information provided for the user or various menus of the mobile phone. The display unit 840 may include a display panel 841, and alternatively, the display panel 841 may be configured in a form of a Liquid Crystal Display (LCD), an Organic Light-Emitting Diode (OLED), etc. Furthermore, the touch panel 831 may cover the display panel 841. When the touch panel 831 detects the touch operation thereon or nearby, the touch operation is transmitted to the processor 880 to determine the type of a touch event, and then the processor 880 provides corresponding visual output on the display panel 841. Although, the touch panel 831 and the display panel 841 implement input of the mobile phone and input functions by serving as two independent parts in FIG. 8, the touch panel 831 and the display panel 841 may be integrated to implement the input of the mobile phone and the input functions in some embodiments.

The at least one sensor 850 may include a light sensor, a motion sensor and other sensors. Specifically, the light sensor may include an ambient light sensor and a proximity sensor, the ambient light sensor may adjust the luminance of a display panel 841 according to the brightness of ambient light, and the proximity sensor may close the display panel 841 and/or backlight when the mobile phone reaches nearby the ear. As one of the motion sensors, an accelerometer sensor may detect the magnitude of an accelerated speed in each direction (generally, three-axis), the size and direction of a gravity may be detected while resting, and the accelerometer sensor may be configured to identify an application of a mobile phone gesture (e.g., horizontal and vertical screen switching, relevant games, and magnetometer gesture calibration), and vibration identification relevant functions (e.g., pedometer and knocking), etc. Other sensors such as a gyroscope sensor, a barometer sensor, a hygrometer sensor, a thermometer sensor and an infrared sensor configurable for the mobile phone will not be elaborated herein.

The audio circuit 860, a loudspeaker 861, and a microphone 862 may provide an audio interface between the user and the mobile phone. The audio circuit 860 may transmit an electric signal converted from the received audio data to the loudspeaker 861, and the loudspeaker 861 converts the electric signal into a sound signal for output. Besides, the microphone 862 converts a collected sound signal into an electric signal, the audio circuit 860 converts the received electric signal into audio data and then outputs the audio data to the processor 880 for processing, the audio data is transmitted to another mobile phone via the RF circuit 810, or the audio data is output to the memory 820 for further processing.

Figure 8:
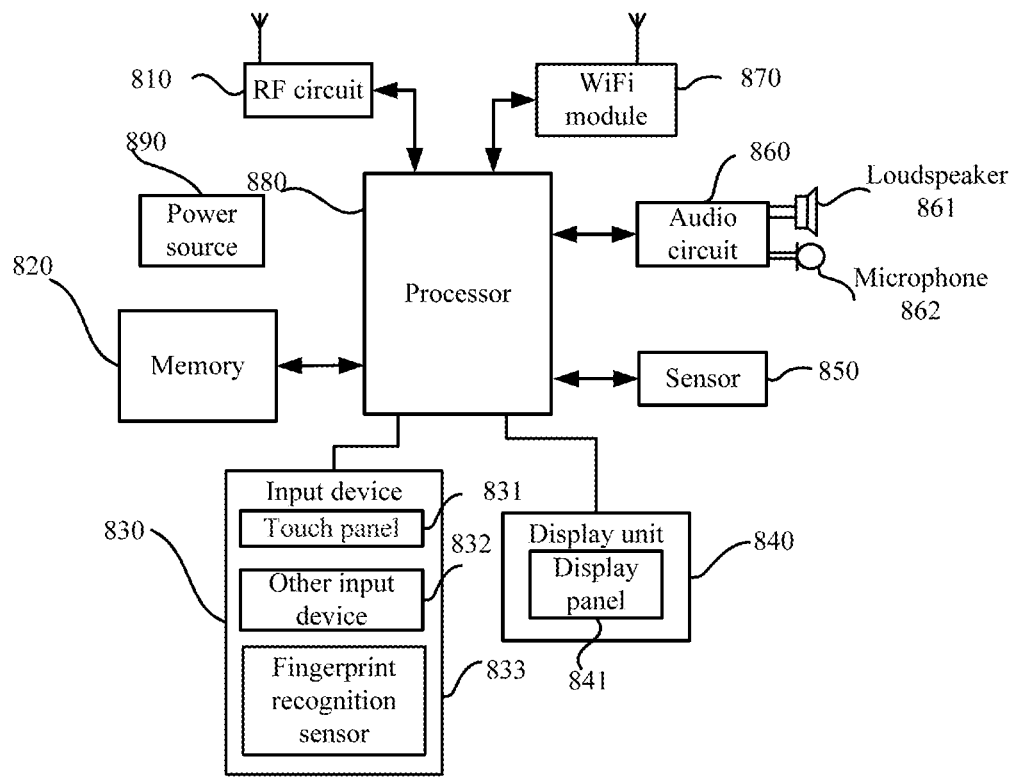
FIG. 8 is a structure diagram of another terminal device according to an embodiment of the present disclosure.

WiFi belongs to a short-range wireless transmission technology, the mobile phone may assist the user in E-mail receiving and sending, webpage browsing, access to streaming media and the like by means of the WiFi module 870, and it provides a wireless wideband internet access for the user. Although FIG. 8 shows the WiFi module 870, it may be understood that the WiFi module 870 does not belong to necessary components of the mobile phone and can totally be omitted without changing the essence of the present disclosure as required.

The processor 880 is a control center of the mobile phone, and is configured to connect all parts of the whole mobile phone by utilizing various interfaces and lines, to run or execute the software program and/or the module stored in the memory 820, and to call data stored in the memory 820 to execute various functions and processing data of the mobile phone, so as to wholly monitor the mobile phone. Alternatively, the processor 880 may include one or more processing units. Preferably, the processor 880 may be integrated with an application processor and a modulation-demodulation processor, the application processor mainly processes an operation system, a user interface, an application program and the like, and the modulation-demodulation processor mainly processes wireless communication. It may be understood that the modulation-demodulation processor may not be integrated into the processor 880.

The mobile phone may further include a power supply 890 (such as a battery) for supplying power to each component. Preferably, the power supply may be connected with the processor 880 logically via a power supply management system, so as to implement functions of charging, discharging and power consumption management and the like by means of the power supply management system.

The mobile phone may further include a camera, a Bluetooth module and the like, which are not shown, though, will not be elaborated herein.

In the foregoing embodiments, each method flow may be implemented on the basis of the structure of the terminal device of FIG. 8.

The embodiments of the present disclosure also provide a computer storage medium. The computer storage medium may store a program, and the program executes some or all of the processes of any method for fingerprint template update in the method embodiments.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the embodiments described in the specification are exemplary embodiments and the actions and modules involved are not necessarily necessary for the present disclosure.

In the foregoing embodiments, descriptions of each embodiment are emphasized respectively, and parts which are not elaborated in a certain embodiment may subject to relevant descriptions of other embodiments.

The apparatus disclosed in embodiments provided herein may be implemented in other ways. For example, the device/apparatus embodiments described above are merely illustrative; for instance, the division of the unit is only a logical function division and there can be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the embodiments.

In addition, the functional units in various embodiments of the present disclosure may be integrated in one processing unit, or each unit may be physically present, or two or more units may be integrated in one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory described above includes a variety of media that can store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or CD, and so on.

The forgoing specifically illustrates the embodiment of the present disclosure. The principles and embodiments of the present disclosure are illustrated by means of examples. The above embodiment illustrations are just used to help to understand the method and core concepts of the present disclosure. For a person skilled in the art, according to the idea of the present disclosure, changes may be made based on the embodiments and application ranges. In conclusion, the present disclosure shall not be limited by the specification.

What is claimed is:

1. A method for updating fingerprint template, comprising:
   obtaining a target fingerprint image that is successfully matched; determining a result by assessing feature points and image quality of the target fingerprint image;
   updating a first target fingerprint template according to the target fingerprint image, when the result meets a fingerprint template update condition, the first target fingerprint template being a fingerprint template that matches with the target fingerprint image; and storing the target fingerprint image for generating a fingerprint template, when a number of the fingerprint templates pre-stored in the terminal device is less than a first threshold.

2. The method of claim 1, wherein updating the first target fingerprint template according to the target fingerprint image comprises:
determining a first non-coincidence region of the target fingerprint image and a second non-coincidence region of the first target fingerprint template, when the number of fingerprint templates pre-stored in a terminal device is greater than or equal to the first threshold, and that a coincidence percentage between overall feature points of the target fingerprint image and overall feature points of the first target fingerprint template is greater than or equal to a second threshold, wherein a coincidence percentage of feature points of the first non-coincidence region and feature points of the second non-coincidence region is less than the second threshold; and
updating the first target fingerprint template according to the coincidence percentage of the feature points of the first non-coincidence region and the feature points of the second non-coincidence region.

3. The method of claim 1, wherein determining the result by assessing the feature points and the image quality meets the fingerprint template update condition comprises:
determining that the result of the assessing the feature points and the image quality meets the fingerprint template update condition, when similarity between overall features of the target fingerprint image and overall features of the first target fingerprint template is greater than or equal to a third threshold, and a clarity of the target fingerprint image is greater than or equal to a fourth threshold.

4. The method of claim 1, wherein obtaining the target fingerprint image which is successfully matched comprises:
obtaining M fingerprint images which are successfully matched in a first period, M being an integer greater than 1; and
determining area of each of the M fingerprint images, and selecting the fingerprint image with the largest area among the M fingerprint images as the target fingerprint image.

5. The method of claim 1, further comprising:
obtaining a second target fingerprint template, wherein a number of times that the second target fingerprint template is successfully matched in a second period is less than or equal to a fifth threshold; and
removing the second target fingerprint template from a terminal device.

6. A terminal device comprising:
a memory configured to store computer-readable program codes; and
a processor configured to invoke the computer-readable program codes to perform acts comprising:
obtaining a target fingerprint image that is successfully matched;
determining a result by assessing feature points and image quality of the target fingerprint image;
updating a first target fingerprint template according to the target fingerprint image, when the result meets a fingerprint template update condition, the first target fingerprint template being a fingerprint template that matches with the target fingerprint image; and
storing the target fingerprint image for generating a fingerprint template when a number of the fingerprint templates pre-stored in the terminal device is less than a first threshold.

7. The terminal device of claim 6, wherein the processor is further configured to invoke the computer-readable program codes to perform:
determining a first non-coincidence region of the target fingerprint image and a second non-coincidence region of the first target fingerprint template, when the number of fingerprint templates pre-stored in a terminal device is greater than or equal to the first threshold, and that a coincidence percentage between overall feature points of the target fingerprint image and overall feature points of the first target fingerprint template is greater than or equal to a second threshold, wherein a coincidence percentage of feature points of the first non-coincidence region and feature points of the second non-coincidence region is less than the second threshold; and
updating the first target fingerprint template according to the coincidence percentage of the feature points of the first non-coincidence region and the feature points of the second non-coincidence region.

8. The terminal device of claim 6, wherein the processor is further configured to determine that the result of assessing the feature points and the image quality meets the fingerprint template update condition, when similarity between overall features of the target fingerprint image and overall features of the first target fingerprint template is greater than or equal to a third threshold, and a clarity of the target fingerprint image is greater than or equal to a fourth threshold.

9. The terminal device of claim 6, wherein the processor that is configured to invoke the computer-readable program codes to perform obtaining the target fingerprint image that is successfully matched is further configured to perform:
obtaining M fingerprint images which are successfully matched in a first period, and M is an integer greater than 1; and
determining area of each of the M fingerprint images, and selecting the fingerprint image with the largest area among the M fingerprint images as the target fingerprint image.

10. The terminal device of claim 6, wherein the processor is further configured to invoke the computer-readable program codes to perform:
obtaining a second target fingerprint template, wherein a number of times that the second target fingerprint template is successfully matched in a second period is less than or equal to a fifth threshold; and
removing the second target fingerprint template from the terminal device.

11. A terminal device comprising:
a memory configured to store computer-readable program codes; and
a processor configured to invoke the computer-readable program codes to perform acts comprising:
obtaining a target fingerprint image that is successfully matched, the target fingerprint image being selected from M fingerprint images which are successfully matched in a first period;
updating a first target fingerprint template according to the target fingerprint image when the target fingerprint image meets a fingerprint template update condition, the first target fingerprint template being a fingerprint template that matches with the target fingerprint image; and storing the target fingerprint image for generating a fingerprint template when a number of fingerprint templates pre-stored in the terminal device is less than a first threshold.

12. The terminal device of claim 11, wherein the processor is further configured to invoke the computer-readable program codes to perform:
determining a first non-coincidence region of the target fingerprint image and a second non-coincidence region of the first target fingerprint template, when the number of fingerprint templates pre-stored in the terminal device is greater than or equal to the first threshold, and that a coincidence percentage between overall feature points of the target fingerprint image and overall feature points of the first target fingerprint template is greater than or equal to a second threshold, wherein a coincidence percentage of feature points of the first non-coincidence region and feature points of the second non-coincidence region is less than the second threshold; and
updating the first target fingerprint template according to the coincidence percentage of the feature points of the first non-coincidence region and the feature points of the second non-coincidence region.

13. The terminal device of claim 12, wherein the processor that is configured to invoke the computer-readable program codes to update the first target fingerprint template is further configured to add the feature points of the first non-coincidence region into the first target fingerprint template when the coincidence percentage of the feature points of the first non-coincidence region and the feature points of the second non-coincidence region is less than or equal to a sixth threshold.

14. The terminal device of claim 12, wherein the processor that is configured to invoke the computer-readable program codes to update the first target fingerprint template is further configured to add feature points of the first non-coincidence region which are not comprised by the second non-coincidence region into the second non-coincidence region when the coincidence percentage of the feature points of the first non-coincidence region and the feature points of the second non-coincidence region is greater than a sixth threshold and less than or equal to a seventh threshold.

15. The terminal of claim 12, wherein the processor that is configured to invoke the computer-readable program codes to update the first target fingerprint template is further configured to replace the feature points of the second non-coincidence region with the feature points of the first non-coincidence region when the coincidence percentage of the feature points of the first non-coincidence region and the feature points of the second non-coincidence region is greater than a seventh threshold and less than or equal to an eighth threshold.

16. The terminal device of claim 11, wherein the processor that is configured to invoke the computer-readable program codes to perform determining that the target fingerprint image meets the fingerprint template update condition is further configured to determine that the target fingerprint image meets the fingerprint template update condition, when similarity between overall features of the target fingerprint image and overall features of the first target fingerprint template is greater than or equal to a third threshold, and a clarity of the target fingerprint image is greater than or equal to a fourth threshold.

17. The terminal device of claim 11, wherein the processor is further configured to invoke the computer-readable program codes to perform:
obtaining a second target fingerprint template, wherein a number of times that the second target fingerprint template is successfully matched in a second period is less than or equal to a fifth threshold; and
removing the second target fingerprint template from the terminal device.

* * * * *